(12) United States Patent
Jeong et al.

(10) Patent No.: US 9,522,336 B2
(45) Date of Patent: Dec. 20, 2016

(54) GAME METHOD AND SYSTEM USING CONDITION ACCORDING TO COLLECTED CHARACTERS

(71) Applicants: NHN Entertainment Corporation, Seongnam-si (KR); NHN BlackPick Corporation, Seongnam-si (KR)

(72) Inventors: Gu Young Jeong, Seongnam-si (KR); Sung Sik Lim, Seongnam-si (KR)

(73) Assignees: NHN Entertainment Corporation, Seongnam-si (KR); NHN Blackpick Corporation, Seongnam-si (KR)

( * ) Notice: Subject to any disclaimer, the term of this patent is extended or adjusted under 35 U.S.C. 154(b) by 257 days.

(21) Appl. No.: 14/281,595

(22) Filed: May 19, 2014

(65) Prior Publication Data

US 2015/0258449 A1  Sep. 17, 2015

(30) Foreign Application Priority Data

Mar. 12, 2014 (KR) ........................ 10-2014-0029277

(51) Int. Cl.
*A63F 13/00* (2014.01)
*A63F 13/828* (2014.01)
(Continued)

(52) U.S. Cl.
CPC ............. *A63F 13/828* (2014.09); *A63F 13/30* (2014.09); *A63F 13/53* (2014.09); *A63F 13/537* (2014.09); *A63F 13/847* (2014.09)

(58) Field of Classification Search
CPC ........ A63F 13/53; A63F 13/537; A63F 13/60; A63F 13/828
See application file for complete search history.

(56) References Cited

U.S. PATENT DOCUMENTS 6,685,565 B2   2/2004  Tanibuchi et al.
2007/0244878 A1  10/2007  Hulme et al.
(Continued)

FOREIGN PATENT DOCUMENTS

JP  2005-000249  1/2005
JP  5345728  11/2013

OTHER PUBLICATIONS

PapaGamer. Marvel: Ultimate Alliane 2 FAQ/Walkthrough for PlayStation 3 [online]. Oct. 6, 2009 [retrieved on Apr. 8, 2016]. Retrieved from the Internet< URL:http://www.gamefaqs.com/ps3/951212-marvel-ultimate-alliance-2/faqs/57837>.*

(Continued)

*Primary Examiner* — Dmitry Suhol
*Assistant Examiner* — David Duffy
(74) *Attorney, Agent, or Firm* — H.C. Park & Associates, PLC

(57) ABSTRACT

A game method and a game system to perform the method and embodied as a computer, the method including configuring a level-based league for teams of users, performing a league game between teams included in the level-based league at predetermined time intervals regardless of whether the users connect to the game system, providing runtime broadcasting information about the league game to a terminal of a user in response to a request for observing the league game from the user that connects to the game system over a network, during a period in which the league game is ongoing, and calculating and managing a progress result of the league game.

19 Claims, 22 Drawing Sheets

(51) Int. Cl.
A63F 13/53 (2014.01)
A63F 13/537 (2014.01)
A63F 13/847 (2014.01)
A63F 13/30 (2014.01)

(56) References Cited

U.S. PATENT DOCUMENTS

2007/0265043 A1 11/2007 Wang et al.
2010/0173708 A1 7/2010 Yamakawa
2012/0231888 A1 9/2012 Abe et al.
2015/0011278 A1 1/2015 Kim

OTHER PUBLICATIONS

Drewman123456789. Marvel Ultimate Alliance 2 LP Ep. 4 Scorcher & The Wizerd [online]. Apr. 14, 2012 [retrieved on Apr. 7, 2016]. Retrieved from the Internet: <URL:https://www.youtube.com/watch?v=aNqDdUlbVho>.*
Sakatsuki Wiki, "Sakatsuku Wiki Sakatsuku 2013 Walkthroughs", www.spoiler.jp/srv/sakatsuku2013/index.php?%E3%83%81%E3%83%BC%E3%83%A0%E3%82%AB%E3%83%A9%E3%83%BC, Oct. 10, 2013, Internet Published, Japan.
Kadokawa Inc., "Sakatsuku Let's Make Pro-Soccer Club Playing Guide", Oct. 22, 2013, Japan.
Tet's International, Inc., "Sakatsuku DS: Touch arid Direct the Perfect Guide," Jan. 8, 2009, pp. 44-45, First Edition, Enterbrain, Inc., Japan.
Sega Inc., "Make Pro-soccer Club! 7 Browser Battle," Dec. 27, 2011, available at www.sakatsuku.com/7/news/battle.html, Sega Inc., Japan.
Non-Final Office Action dated Mar. 2, 2016, in U.S. Appl. No. 14/281,565.
Japanese Office Action dated Dec. 8, 2015, in Japanese Patent Application No. 2014-101484.
"Shingeki No Bahanut 'Team Skill,'" May 25, 2013, available at https://web.archive.org/web/20130525045233/http://bahamut.omiki.com/team.html, Japan.
"Kakusansei Million Arthur," Jun. 20, 2012, available at http://app.famitsu.com/20120620_72466, Japan.
Japanese Office Action dated Jun. 16, 2015, in Japanese Patent Application No. 2014-101273.
Japanese Office Action dated Jun. 16, 2015, in Japanese Patent Application No. 2014-101230.
Japanese Office Action dated Jun. 23, 2015, in Japanese Patent Application No. 2014-101484.
Japanese Decision to Grant a Patent dated Nov. 10, 2015, in Japanese Patent Application No. 2014-101230.
Japanese Decision to Grant a Patent dated Dec. 8, 2015, in Japanese Patent Application No. 2014-101273.
NHN Entertainment Corporation, "<Football Day> whistle rang! Public services is entered," Nov. 24, 2013, Republic of Korea, http://www.nhnent.com/ko/pr/pressReleaseDetail.nhn.
NHN Entertainment Corporation, "<Football Day> regular season around the corner! Public service is entered from 24," Nov. 19, 2013, Republic of Korea, http://www.nhnent.com/ko/pr/pressReleaseDetail.nhn.
NHN Entertainment Corporation, "Football Day Help—League Configuration," Nov. 24, 2013, Republic of Korea, http://fd.naver.com/guide/guide?page=guide_league_system_step.
NHN Entertainment Corporation, "Football Day Help—How it works league," Nov. 24, 2013, Republic of Korea, http://fd.naver.com/guide/guide?page=guide_league_system_rule.
NHN Entertainment Corporation, "Football Day Help—Schedule," Nov. 24, 2013, Republic of Korea, http://fd.naver.com/guide/guide?page=guide_league_schedule.
NHN Entertainment Corporation, "Football Day Help—Relay screen," Nov. 24, 2013, Republic of Korea, http://fd.naver.com/guide/guide?page=guide_league_interference_desc.
NHN Entertainment Corporation, "Football Day Help—intervention," Nov. 24, 2013, Republic of Korea, http://fd.naver.com/guide/guide?page=guide_league_interference_change.
NHN Entertainment Corporation, "Football Day Help—Team Color," Nov. 24, 2013, Republic of Korea, http://fd.naver.com/guide/guide?page=guide_squad_teamcolor.
NHN Entertainment Corporation, "Football Day Help—Lineup," Nov. 24, 2013, Republic of Korea, http://fd.naver.com/guide/guide?page=guide_squad_lineup.
NHN Entertainment Corporation, "My hand's <Football Day>, now enjoy real-time mobile!," Dec. 29, 2013, Republic of Korea, http://www.nhnent.com/ko/pr/pressReleaseDetail.nhn.
NHN Entertainment Corporation, "<Football Day> mobile service update for adding 'real-time intervention' function," Jan. 22, 2014, Republic of Korea, http://www.nhnent.com/ko/pr/pressReleaseDetail.nhn.
Final Office Action dated Jul. 28, 2016, in U.S. Appl. No. 14/281,565.

* cited by examiner

FIG. 8

| Name | Position | Level | Condition | Strength | Average | Scores | Assist |
|---|---|---|---|---|---|---|---|
| AAAA | LW | 1 | ▲ | 4% | 0 | 0 | 0 |
| BBBB | LB | 1 | ▽ | 4% | 0 | 0 | 0 |
| CCCC | CB | 1 | △ | 1% | 0 | 0 | 0 |
| DDDD | CM | 1 | ▲ | 5% | 0 | 0 | 0 |
| EEEE | GK | 1 | ▲ | 1% | 0 | 0 | 0 |
| FFFF | ST | 1 | ▲ | 1% | 0 | 0 | 0 |
| GGGG | CDM | 1 | ▽ | 3% | 0 | 0 | 0 |
| HHHH | CB | 1 | ▲ | 4% | 0 | 0 | 0 |
| IIII | CM | 1 | ▲ | 5% | 0 | 0 | 0 |
| JJJJ | RB | 1 | ▲ | 1% | 0 | 0 | 0 |
| KKKK | RW | 1 | △ | 5% | 0 | 0 | 0 |

| Player substitution | Strategy instruction | Formation 4-4-2 |

| Name | Position | Level | Condition | Strength | Average | Scores | Assist |
|---|---|---|---|---|---|---|---|
| LLLL | | 1 | ▲ | 4% | 0 | 0 | 0 |
| MMMM | | 1 | ▲ | 4% | 0 | 0 | 0 |
| NNNN | | 1 | ▲ | 3% | 0 | 0 | 0 |
| OOOO | | 1 | ▲ | 5% | 0 | 0 | 0 |

Pro League 1 (2014-8th season)

| Class | Ranking | Club name | No of games | Win | Tie | Lose |
|---|---|---|---|---|---|---|
| Elevation rank | 1 ( - ) | Team A | 66 | 51 | 9 | 6 |
| | 2 ( - ) | Team B | 66 | 45 | 4 | 17 |
| Advancement rank to elevation PO | 3 ( ↑1 ) | Team C | 66 | 39 | 8 | 19 |
| | 4 ( ↓1 ) | Team D | 66 | 37 | 13 | 16 |
| | 5 ( - ) | Team E | 66 | 33 | 12 | 21 |
| | 6 ( - ) | Team F | 66 | 30 | 10 | 26 |
| Remaining rank | 7 ( ↑1 ) | Team G | 66 | 24 | 13 | 29 |
| | 8 ( ↓1 ) | Team H | 66 | 24 | 12 | 30 |
| Degradation rank | 9 ( - ) | Team I | 66 | 19 | 17 | 30 |
| | 10 ( - ) | Team J | 66 | 14 | 10 | 42 |
| | 11 ( - ) | Team K | 66 | 10 | 10 | 46 |
| | 12 ( - ) | Team L | 66 | 9 | 4 | 53 |

FIG. 13

| Time | Competition name | Location | Competing club | Game result | | |
|---|---|---|---|---|---|---|
| 10:00 | Regular league 65 Round | AWAY | TeamA | 1:2 | WIN | Details |
| 11:00 | Regular league 66 Round | HOME | TeamC | 4:0 | WIN | Details |
| 12:00 | Regular league 67 Round | AWAY | TeamD | 2:1 | LOSE | Details |
| 13:00 | Second half league cup semifinal first-leg | AWAY | TeamC | Strategy comparison | | |
| 14:00 | Regular league 68 Round | HOME | TeamE | Strategy comparison | | |
| 15:00 | Regular league 69 Round | HOME | TeamF | Strategy comparison | | |
| 16:00 | Regular league 70 Round | HOME | TeamG | Strategy comparison | | | semifinal first-leg — Sun | Mon | Tue | Wed | Thu | | Sat

FIG. 14

| Time | Competition name | Location | Competing club | Game result | |  |
|---|---|---|---|---|---|---|
| 10:00 | Regular league 65Round | AWAY | TeamA | 1:2 | WIN | Details |
| 11:00 | Regular league 66Round | HOME | TeamC | 4:0 | WIN | Details |
| 12:00 | Regular league 67Round | AWAY | TeamD | 2:1 | LOSE | Details |
| 13:00 | Second half league cup semifinal first-leg | AWAY | TeamC | | | |
| 14:00 | Regular league 68Round | HOME | TeamE | Strategy comparison | | |
| 15:00 | Regular league 69Round | HOME | TeamF | Strategy comparison | | |
| 16:00 | Regular league 70Round | HOME | TeamG | Strategy comparison | | |

Team feature list

[Applying S] La Liga 18

Team characteristic triggered
when 18 players from Spain league gather

All the abilities+8

[Applying B] 9 members of national team for spain

Team characteristic
(including only key players)
triggered when 9 members of
national team for Spain gather All the abilities+3

[Applicable D] Strongest squad

Team characteristic triggered
when 7 players with level 6 or more gather

Acceleration +4

GAME METHOD AND SYSTEM USING CONDITION ACCORDING TO COLLECTED CHARACTERS

CROSS REFERENCE TO RELATED APPLICATION

This application claims priority from and the benefit of Korean Patent Application No. 10-2014-0029277, filed on Mar. 12, 2014, which is hereby incorporated by reference for all purposes as if fully set forth herein.

BACKGROUND

Field

Exemplary embodiments of the present invention relate to a game method and system using condition according to collected characters.

Discussion of the Background

In a simulation method and system using communication between a server and a terminal according to the related art, it is inconvenient to download a program for a simulation and install the downloaded program in a terminal. In addition, the simulation is allowed to run only in the terminal in which the program is installed. For example, in the case of simulating a league of a sports game such as a soccer game, a user may simulate the sports game only in a terminal in which a relevant program is installed, and thus, may experience spatial constraints. In addition, when a simulation proceeds at predetermined time intervals through association between a plurality of users, a user may experience both temporal and spatial constraints.

SUMMARY OF THE INVENTION

Exemplary embodiments of the present invention provide a game method and system that may perform a league game by grouping teams of users based on a level-based league, or grouping a team including at least one bot with the teams of the users based on a level-based league, and by processing a game to be automatically performed between teams of users included in the same league at predetermined time intervals.

Exemplary embodiments of the present invention also provide a game method and system that may minimize temporal constraints and spatial constraints, by providing a web-based simulation for a league game, and may further provide a simulation of a sports game by simplifying a simulation representation.

Exemplary embodiments of the present invention also provide a game method and system that may perform a game by offering a user a variety of abilities, based on conditions of characters included in a single team and by applying, to at least one character, abilities corresponding to a predetermined number of team features selected by the user from among the offered team features.

Exemplary embodiments of the present invention also provide a game method and system that may perform a game by determining a chemistry value indicating a relationship between characters, based on a relationship between characters included in a single team, by graphically displaying the determined chemistry value on a screen, and by applying the chemistry value between characters.

Additional features of the invention will be set forth in the description which follows, and in part will be apparent from the description, or may be learned by practice of the invention.

Exemplary embodiments of the present invention disclose a game method performed by a game system embodied as a computer, the method including managing information about a plurality of team features triggered during a game based on a predetermined condition, verifying team features capable of being triggered through characters held by a user among the plurality of team features, providing information about the verified team features and a user interface for setting a team feature to a terminal of the user, verifying the team feature set through the user interface, based on the provided information about the team features, and applying abilities that is values corresponding to the set team feature to characters that trigger the set team feature among characters of the user.

Exemplary embodiments of the present invention also disclose a game system embodied as a computer, the game system including a team feature manager configured to manage information about a plurality of team features triggered during a game based on a predetermined condition, a team feature verifier configured to verify team features capable of being triggered through characters held by a user among the plurality of team features, a team feature provider configured to provide information about the verified team features and a user interface for setting a team feature to a terminal of the user, a team feature setter configured to verify the team feature set through the user interface, based on the provided information about the team features, and an abilities applier configured to apply abilities that is values corresponding to the set team feature to characters that trigger the set team feature among characters of the user.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 8 illustrates an example of a user interface according to exemplary embodiments of the present invention.

FIG. 12 illustrates a portion of a screen on which information about a configured league is displayed, according to exemplary embodiments of the present invention.

FIGS. 13 and 14 illustrate a portion of a screen on which information about the progress of a game is displayed, according to exemplary embodiments of the present invention.

FIG. 15 illustrates an example of a screen on which a team feature is displayed, according to exemplary embodiments of the present invention.

DETAILED DESCRIPTION OF THE ILLUSTRATED EMBODIMENTS

Figure 1:
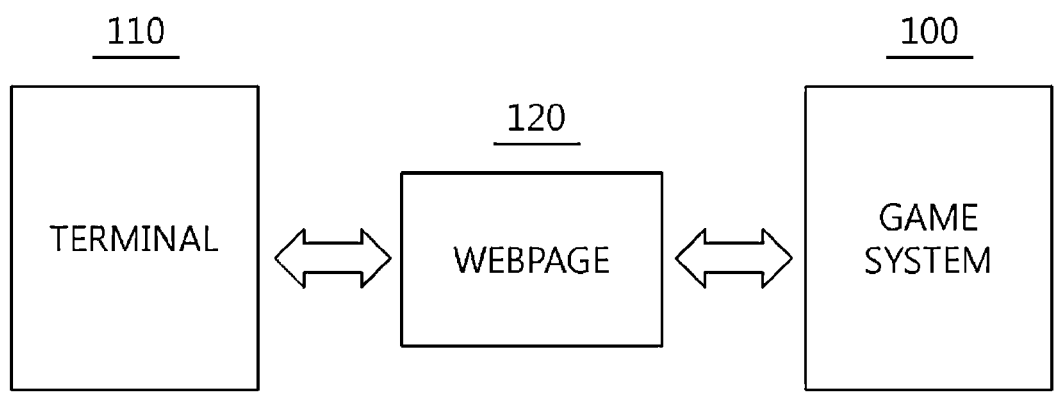
FIG. 1 illustrates a relationship between a game system and a terminal according to exemplary embodiments of the present invention.

Exemplary embodiments of the present invention will be described in detail with reference to the accompanying drawings. These exemplary embodiments will be described in detail for those skilled in the art in order to practice the present invention. It should be appreciated that various exemplary embodiments of the present invention are different but do not have to be exclusive. For example, specific shapes, configurations, and characteristics described in an exemplary embodiment of the present invention may be implemented in another exemplary embodiment without departing from the spirit and the scope of the present invention. In addition, it should be understood that position and arrangement of individual components in each disclosed exemplary embodiment may be changed without departing from the spirit and the scope of the present invention. Therefore, a detailed description described below should not be construed as being restrictive. In addition, the scope of the present invention is defined only by the accompanying claims and their equivalents if appropriate. Similar reference numerals will be used to describe the same or similar functions throughout the accompanying drawings. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The terminology used herein is for the purpose of describing exemplary embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements and/or components, but do not preclude the presence or addition of one or more other features, integers, steps, operations, elements, components, and/or groups thereof.

It will be understood that when an element is referred to as being "connected to" another element, it can be directly connected to the other element, or intervening elements may be present.

Hereinafter, exemplary embodiments of the present invention will be described in detail with reference to the accompanying drawings.

FIG. 1 illustrates a relationship between a game system 100 and a terminal 110, according to exemplary embodiments of the present invention. Referring to FIG. 1, the game system 100, the terminal 110, and a webpage 120 are provided.

The game system 100 may refer to a server that is configured to manage users and account information of the users. The game system 100 may be further configured to provide game data to the terminal 110 through the webpage 120.

The terminal 110 may refer to a user device, such as a personal computer (PC) or a smartphone, which may access the webpage 120 through wired or wireless communication.

A user may access the webpage 120 through the terminal 110. The user may adjust and set a variety of settings during the progress of a game, such as a login, a selection of camp, a selection of character, a selection of strategy, and predetermined processes for enhancing abilities of a character. Here, the game system 100 may perform a game based on settings of users and abilities of characters, and may provide a progress simulation of the game or a progress result of the game to a user through the webpage 120. The progress simulation of the game or the progress result of the game may be displayed on a screen of the terminal 110 connected to the webpage 120 and may thereby be provided to the user. For example, the terminal 110 may configure a screen using a HyperText Markup Language (HTML), Cascading Style Sheets (CSS), and/or JavaScript. Also, messaging between the game system 100 and the terminal 110 may be processed using HTTP-based ajax, comet, and/or reverse ajax.

In this example, the progress of a game may be processed by the game system 100, and thus, processing of game progress by the user terminal 110 may be fundamentally prevented. For example, in the case of a soccer game, a scenario for the progress of a game or a result of the game may be determined in advance based on abilities of characters of two teams that are playing the soccer game, formation between characters, a team feature, and a chemistry operation to be described later. A simulation result or a game result corresponding to the determined scenario may be provided to users through the webpage 120.

Accordingly, although the user does not install a separate program in the terminal 110, the user may obtain the game simulation or the game result through a basic browser, and thus, the inconvenience coming from downloading and installing a program may be avoided.

In a game method according to exemplary embodiments of the present invention, a game may be performed by grouping teams of users into level-based leagues, and by performing a league game or a tournament between teams of users belonging to a single league. For example, teams of each user may represent soccer teams configured by the respective users, and the soccer teams of the respective users may be grouped into the level-based leagues. As an example, the level-based leagues may include, but are not limited to, a Rookie League, an Amateur league, a Semi-Pro League, a Pro League 1, a Pro League 2, a Pro League 3, and a Championship League. Each level-based league may also include leagues based on the number of users. In an example in which a single league includes 12 teams, and the number of teams of users to be included in a rookie league is 120, ten rookie leagues each including 12 teams, may be configured. If the number of teams of users is 110, the remaining ten teams to configure ten rooky leagues may be configured as non-player controlled and managed ("bot") teams.

Teams constituting a single league may play in a league game that is automatically executed at predetermined time intervals. For example, regardless of whether users connect to the game system. Once the league is terminated, teams ranking a predetermined place or more may advance to a higher level league, and may play a league game again in the higher level league.

Here, although a game between teams is automatically performed by the game system 100, a progress result of the game may be determined by applying a variety of setting values set by a user, such as abilities of characters held by users. For example, these abilities may include soccer player character, formations, and strategies. For example, the game system 100 may include a scenario pool that stores probable scenarios for the progress of a game. The game system 100 may produce a result by probabilistically selecting from the scenario pool, and listing a scenario suitable for a current situation using a basic factor and a control factor. The basic factor may include preset values, such as abilities of players, an initial formation, and an initial strategy. The control factor may include a factor for a user-set a strategy. For example, taking a soccer game as an example, the control factor may include values adjustable by a user before or during a game, such as a weight for a flank attack, a weight for a center attack, a frequency of mid-range shooting, a level of balance between an attack and a defense, a type of a pass in a team (for example, a short pass or a long pass), a frequency of pass or dribble, and a weight for each formation.

Automatically proceeding games may be broadcasted in runtime for users desiring to observe the games. Hereinafter, examples of a simulation method for broadcasting such a game in runtime will be described.

Figure 2:
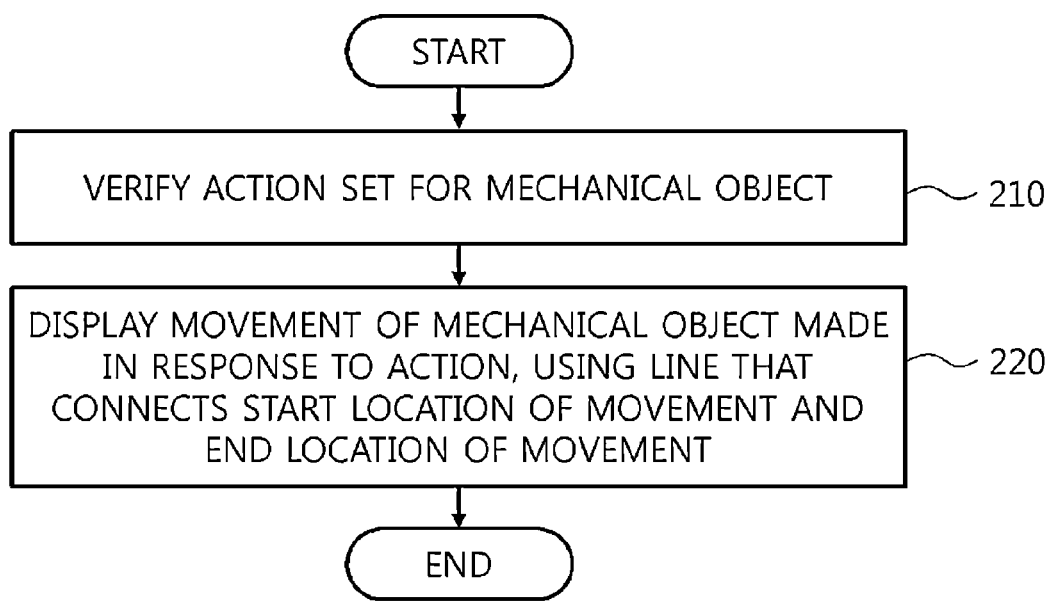
FIG. 2 is a flowchart illustrating a simulation method performed by a terminal, according to exemplary embodiments of the present invention.

FIG. 2 is a flowchart illustrating a simulation method performed by a terminal according to exemplary embodiments of the present invention. For example, the simulation method of FIG. 2 may be performed by the terminal 110 of FIG. 1.

In operation 210, the terminal 110 may verify an action set for a mechanical object. Herein, the mechanical object may correspond to a virtual object movable in response to an action of a virtual character appearing in a simulation. For example, the mechanical object may include a ball object. A ball may indicate a round exercise tool that is made of leather, rubber, or plastic, and can be passed, dribbled, kicked, or rolled. The ball object may indicate a virtual ball that is represented on the simulation and may be moved in response to an action of a character.

In operation 220, the terminal 110 may display a movement of the mechanical object made in response to the action, using a line that connects a start location of the movement and an end location of the movement. For example, the action may occur in response to a motion that is triggered by at least one character among a plurality of characters, with respect to the mechanical object. For example, the mechanical object may include a ball object, and the motion that is triggered by the at least one character with respect to the mechanical object may include at least one of pass, dribble, intercept, and shooting that are triggered by the at least one character with respect to the ball object. A character may include a virtual character capable of interacting with the ball object. A success of the motion may be determined based on at least one of a location and abilities of each of the characters, a formation, abilities of each of camps into which characters are grouped, a characteristic for each motion, and a strategy determined by a user.

Figure 3:
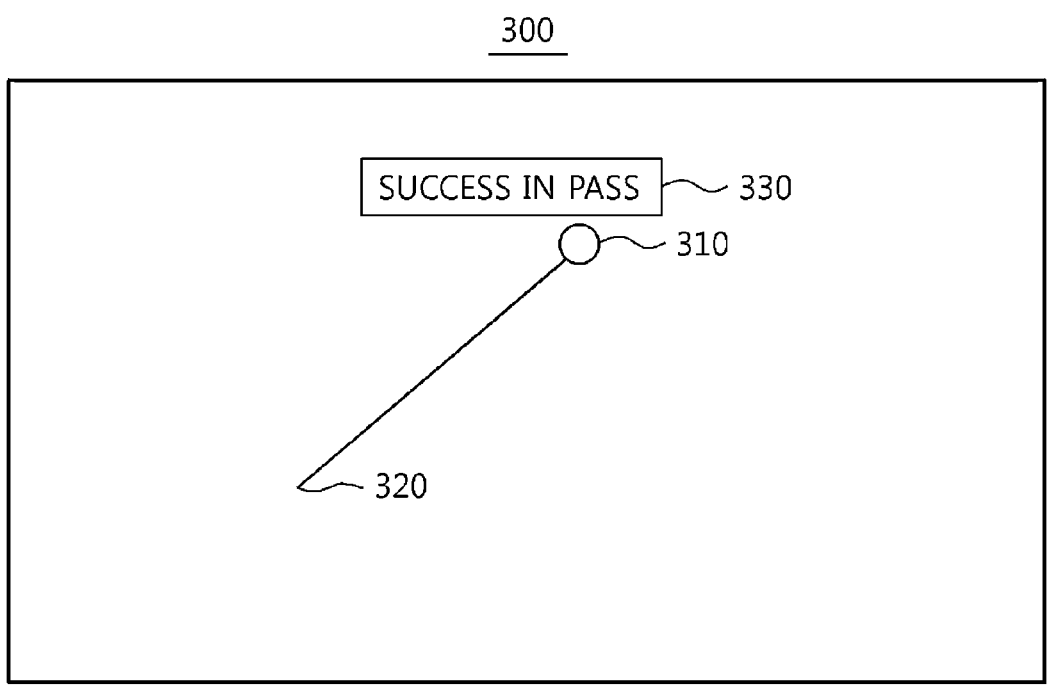
FIG. 3 illustrates an example of displaying a movement of a mechanical object using a line, according to exemplary embodiments of the present invention.

FIG. 3 illustrates an example of displaying a movement of a mechanical object 310 using a line, according to exemplary embodiments of the present invention. A first screen 300 refers to an example of a screen displayed on a display of the terminal 110 through the webpage 120 of FIG. 1. Here, FIG. 3 illustrates a simulation result in which the mechanical object 310 has moved from a start location 320 to a location indicated on the first screen 300. The end location described in operation 220 may be a center of the mechanical object 310.

For example, in the case of simulating a soccer game, the mechanical object 310 may be a soccer ball object, and the first screen 300 may show a scene in which an action of a first character passing a soccer ball to a second character has been simulated. As described above, although a character is not separately displayed, a method of providing simulation information may be simplified by displaying a movement of the mechanical object 310 made in response to an action of a character using a line.

As another example, identification (ID) information of a character controlling the mechanical object 310 and ID information of the action may be further displayed in conjunction with the line or the mechanical object 310. FIG. 3 illustrates an example in which "success in pass" 330 that is ID information of the action is further displayed in conjunction with the mechanical object 310.

In a simulation method according to exemplary embodiments, at least one of a type and a thickness of the line may be determined based on the type of action of the mechanical object 310 and/or characters, as shown below.

Figure 4:
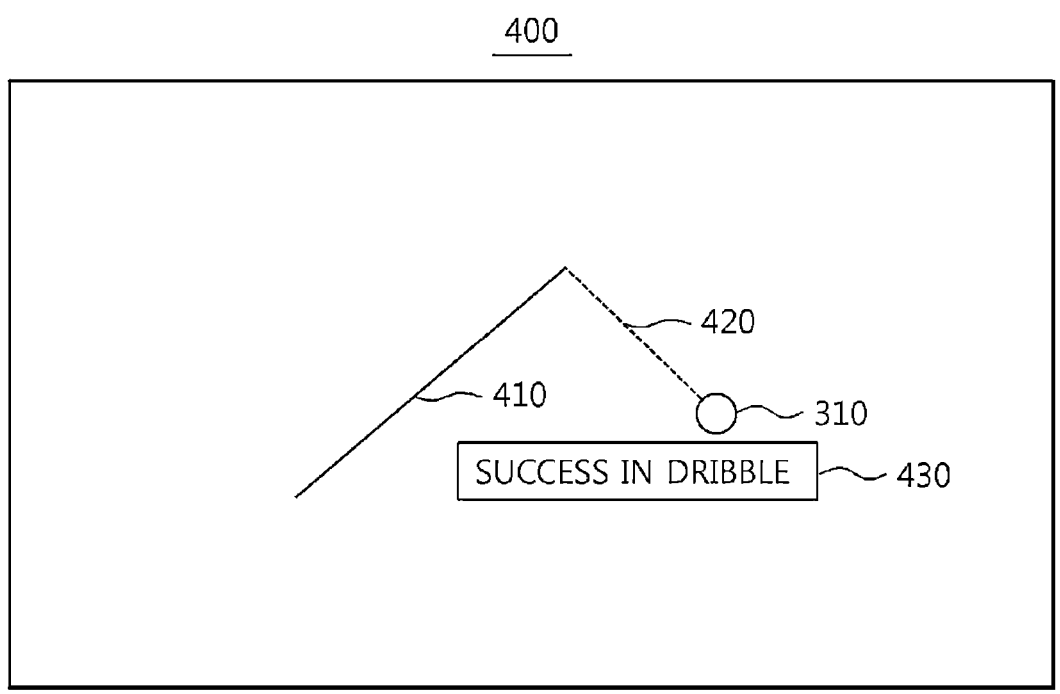
FIG. 4 illustrates an example of a type of a line determined based on an action, according to exemplary embodiments of the present invention.

FIG. 4 illustrates an example of a type of a line determined based on an action, according to exemplary embodiments of the present invention. A second screen 400 shows a scene in which the mechanical object 310 of the first screen 300 has been additionally moved. Here, to indicate that the additional movement of the mechanical object 310 of FIG. 4 has been made in response to an action different from the action of FIG. 3, the initial movement is indicated using a solid line 410 and the additional movement is indicated using a dotted line 420.

For example, as described above with the example of FIG. 3, the solid line 410 may indicate the action of the first character passing the soccer ball to the second character. The dotted line 420 may refer to a scene in which an action of the second character receiving and then dribbling the soccer ball has been simulated.

Here, FIG. 4 illustrates an example in which "success in dribble" 430. That is, ID information of the action is further displayed in conjunction with the mechanical object 310.

In a simulation method according to exemplary embodiments, a color of the line may be determined based on a camp of a character controlling the mechanical object 310.

Figure 5:
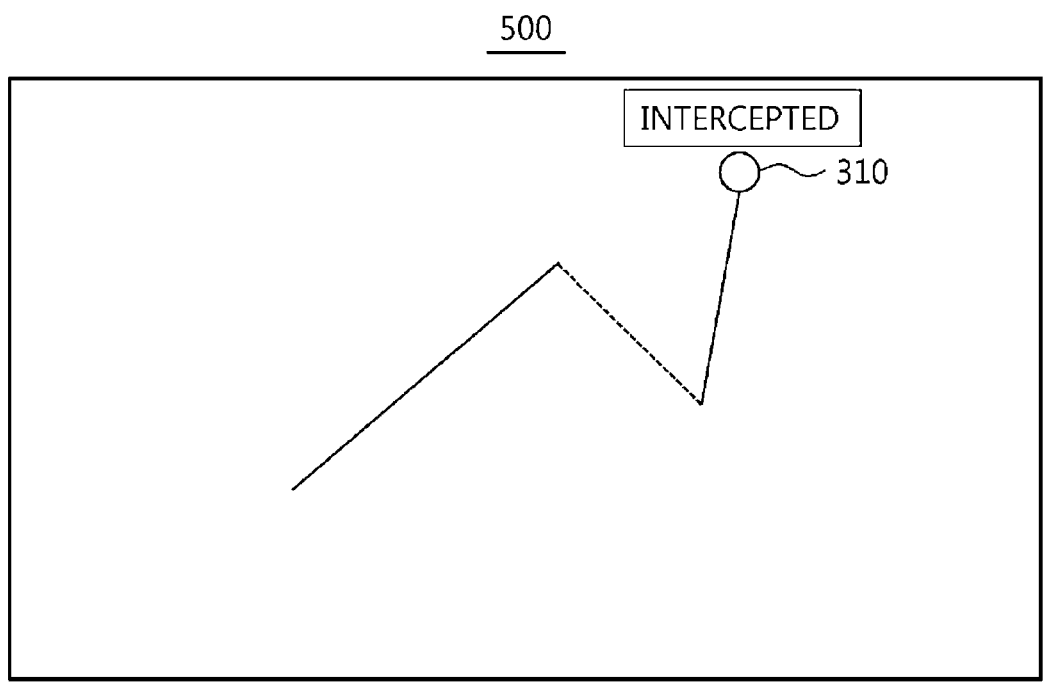
FIG. 5 illustrates an example of displaying a movement of a mechanical object made by characters of a first camp, according to exemplary embodiments of the present invention.
Figure 6:
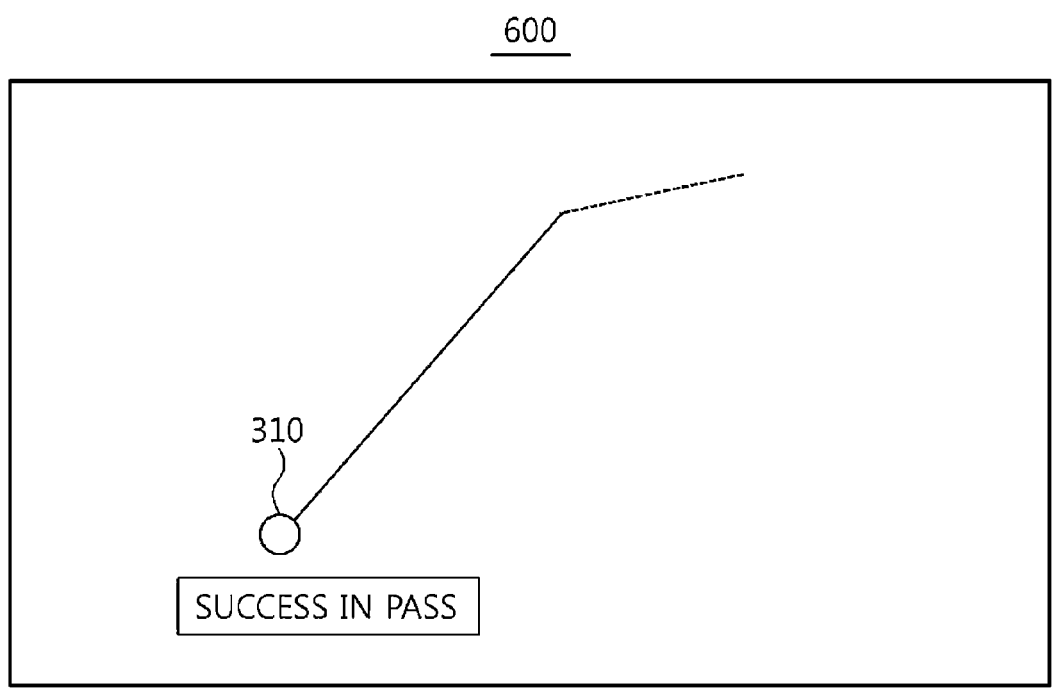
FIG. 6 illustrates an example of displaying a movement of a mechanical object made by characters of a second camp, according to exemplary embodiments of the present invention.

FIG. 5 illustrates an example of displaying a movement of the mechanical object 310 made by characters of a first camp according to exemplary embodiments of the present invention, and FIG. 6 illustrates an example of displaying a movement of the mechanical object 310 made by characters of a second camp according to exemplary embodiments of the present invention.

A third screen 500 shows a scene in which the mechanical object 310 of the second screen 400 has been additionally moved. For example, the third screen 500 illustrates a simulation result in which the second character of the first camp has dribbled the soccer ball and then attempted to pass the soccer ball. However, the soccer ball has been intercepted by a third character of a second camp and thus, possession of the mechanical object 310 has been turned over to the second camp.

A fourth screen 600 shows a scene in which a movement of the mechanical object 310 has been made by a character of the second camp. For example, the fourth screen 600 illustrates a simulation result in which the third character of the second camp has dribbled the intercepted soccer ball and has successfully passed the soccer ball to a fourth character of the second camp. Here, dissimilar to the third screen 500, a color of the line may be changed from black to gray on the fourth screen 600. As described above, the color of the line may be determined based on a camp of a character controlling the mechanical object 310.

As described above, in a case in which the simulation proceeds through association between characters belonging to a plurality of camps, and a movement of a mechanical object is made in response to continuous actions of characters belonging to the same camp, the movement of the mechanical object may be displayed using continuous lines. In this example, if possession of the mechanical object is turned over to a character of another camp, and thereby the mechanical object is moved, the existing lines may be removed and a subsequent movement of the mechanical object may be displayed again using lines.

In the manner described above, actions continuously occurring due to characters of the same camp may be represented as a single scene.

Referring again to FIG. 2, although not illustrated, operation 210 may additionally include receiving, from a simulation server, scene data including at least one set of unit data, and verifying an action included in the at least one set of unit data. The above operations may also be performed by the terminal 110. The simulation server may correspond to the game system 100 or may be included in the game system 100.

The unit data may include information about an action occurring because of one characters grouped into different camps, an action occurring between two characters grouped into the same camp, or an action occurring between two characters grouped into different camps. For example, in the case of simulating a soccer game, the action occurring due to one character may include an action such as "dribble" or "shooting". Also, the action occurring between two characters grouped into the same camp may include "pass". The action occurring between two characters grouped into different camps may include "intercept" or "goalkeeper's nice blocking"

Also, the scene data may include unit data of at least one action continuously occurring due to characters grouped into the same camp. That is, the scene data may include information about actions included in a single scene. For example, on the third screen 500 of FIG. 5, three continued actions, "success in pass", "success in dribble", and "intercepted" may compose a single scene.

The game system 100 may provide data to the terminal 110, based on a unit of scene data. The terminal 110 may indicate lines based on a unit of an action, using unit data included in scene data. Here, to enhance the system efficiency, the game system 100 may generate, in advance, scene data for the entire simulation prior to providing a simulation result, and may provide the scene data to the terminal 110 through the webpage 120, based on a unit of scene data.

According to exemplary embodiments, the simulation method of FIG. 2 may determine an occurrence of a highlight scene, that is, whether the highlight scene has occurred, based on a probability set for a type of scene data. For example, the simulation method may verify whether the highlight scene has occurred based on a probability set for each scene including a plurality of actions. Here, in operation 220, in response to the occurrence of the highlight scene, the terminal 110 may display a movement process of character objects for a plurality of characters and a movement process of the mechanical object, instead of using the line. Taking a simulation of a soccer game as an example, the highlight scene may occur 100% of the time for a successful goal scene, 50% of the time for an unsuccessful goal scene, and 50% of the time for an offside scene. A single highlight scene may be probabilistically selected from among highlight scenes closest to a current situation through a set of control variables for each highlight scene in a pool configured through an exclusive editor. The game system 100 may transfer data associated with the highlight scene to the terminal 110 using a protocol, for example, a JavaScript Object Notation ("JSON") format, predetermined between the game system 100 and the terminal 110. Also, the highlight scene may be displayed in such a manner that the terminal 110 loads the data transferred through JavaScript, for example, a JavaScript eval( ) function, to a storage unit such as a memory, verifies a type of unit data to be displayed, and displays the type of unit data using a display method suitable for each type.

Figure 7:
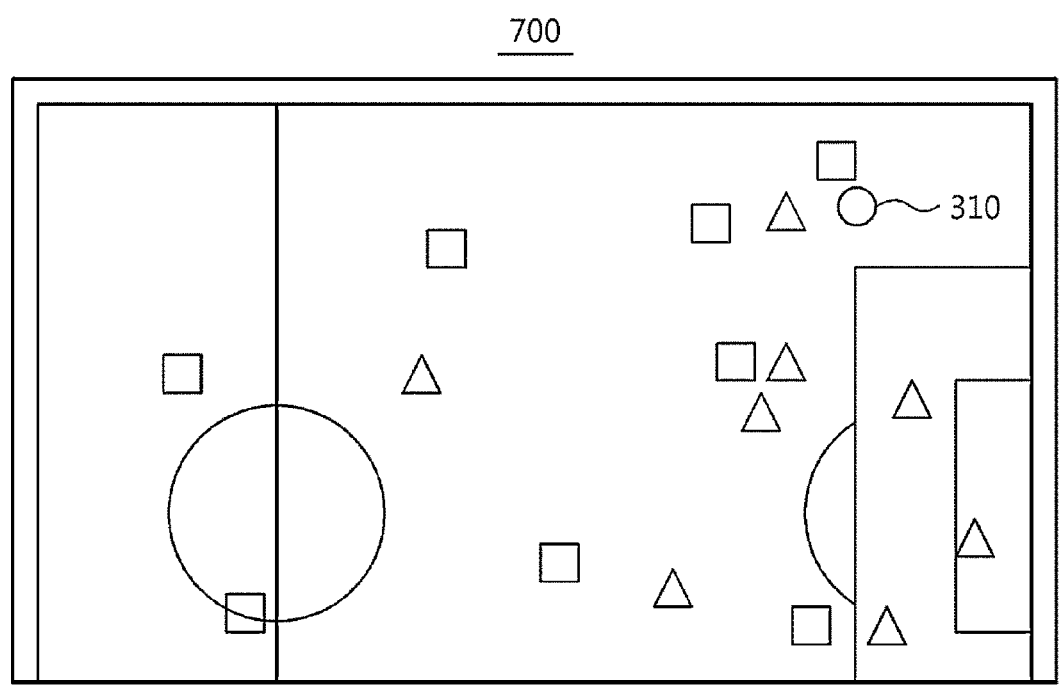
FIG. 7 illustrates an example of a highlight scene according to exemplary embodiments of the present invention.

FIG. 7 illustrates an example of a highlight scene according to exemplary embodiments of the present invention. A fifth screen 700 refers to an example of a scene in which all of character objects for characters of two camps and the mechanical object 310 are displayed. In the example of FIG. 7, characters of a first camp are indicated as rectangular character objects, and characters of a second camp are indicated as triangular character objects. Here, by displaying a movement process of the character objects and a movement process of the mechanical object 310, instead of displaying a movement of the mechanical object 310 using a line for each action, it is possible to provide a simulation result of actions included in the highlight scene.

Information used to represent a soccer stadium is displayed as an example of a soccer game simulation on the fifth screen 700. Although only the mechanical object 310 and lines are indicated in FIGS. 3 through 6, a variety of additional information may be displayed based on a type of simulation. Further, although only character objects of each camp are displayed, a character object such as a referee may be further displayed depending on a necessity.

According to exemplary embodiments, an action may occur in response to a motion of which a success is determined based on at least one of a location and abilities of each of the characters, a formation, abilities of each of camps into which the characters are grouped, a characteristic for each motion, and a strategy determined by a user. For example, whether a "pass" motion has succeeded may be determined based on at least one of the aforementioned information. In response to a success of the "pass" motion, a "success in pass" action may occur. In response to a failure of the "pass" motion, an "intercepted" action or an "end-line out" action may occur.

For example, the soccer game simulation may use factors as follows, however, a person having skill in the art will recognize that there are many other factors that may be used additionally or alternatively:

1. Player (character)

Statistics of a player

Attack: shooting, goal decisiveness, mid-range shoot

Defense: tackle, team work for defense, man-to-man defense

Speed: main strength, acceleration, quickness

Technique: heading, positioning, individual skill, penalty kick, free kick

Pass: short pass, long pass, cross

Physical: stamina, power, body balance

Goalkeeper: ball handling, reflexes, one-on-one defense, goal kicking capability Intangible: understanding of strategy, leadership, aggressiveness, ball control, visual field, non-stop shoot, standing tackle, long throw-in, dribble speed, presence of mind 2. Team Team strategy Substitution strategy: sets a player substitution strategy based on circumstances.

Operation strategy: sets a direction of attack, strength of tackle, a mid-range shoot, a pass type, and balance between attack and defense.

Strategy card: sets an advantage card enforced in certain special circumstances during a game.

Player designation: sets a captain, a free kicker, a corner kicker, a throw-inner, and a penalty kicker.

Team formation

Team feature: team advantage selectable based on chemistry between players

Team chemistry: chemistry between players

3. User intervention

Substitution/switch of players

Instructing an operation strategy

Also, in the example of the soccer game simulation, a success of each motion may be determined based on examples as follows:

1. "Pass" motion: A success of the pass motion is probabilistically determined by comparing an absolute value and a relative value with respect to individual abilities of an attacker required for the pass, individual abilities of a defender, and integrated abilities of each team or camp, based on a characteristic of each pass, for example, a pass type such as a short pass, a long pass, and a cross pass in such regions such as an attacking camp, a middle camp, and a defending camp, each having a respective strategy employed for attack or defense at a pass point.

2. "Dribble" motion: A success of the dribble motion is probabilistically determined by comparing an absolute value and a relative value with respect to individual abilities of an attacker required for the dribble, individual abilities of a defender, and integrated abilities of each team or camp, based on a characteristic of each dribble, for example, a dribble type such as a short dribble and a long dribble, a region such as an attacking camp, a middle camp, and a defending camp, each region having a respective strategy employed for attack or defense at a dribble point.

3. "Shooting" motion: A success of the shooting motion is probabilistically determined by comparing an absolute value and a relative value with respect to individual abilities of an attacker, individual abilities of a defender, and integrated abilities of each team or camp required for shooting, based on a characteristic of each shooing, for example, a shooting type such as a short shooting, a mid-range shooting, and a long shooting in different regions such as a penalty area, a front area, and a flank area.

According to exemplary embodiments, the webpage 120 may include a user interface for changing at least one of a formation, a strategy, and a character. For example, the terminal 110 may provide a user with the user interface by displaying the webpage 120. In this example, the game system 100 may regenerate scene data after a point in time when the change is made, may provide the regenerated scene data to the terminal 110 through the webpage 120, and thereby apply a real-time intervention of the user during a simulation process.

FIG. 8 illustrates an example of a user interface 800 according to exemplary embodiments of the present invention. The user interface 800 may be displayed on a screen of the terminal 110 together with screens described above with reference to FIGS. 3 through 7. Among team players of a user of the terminal 110, for example, characters of a user camp, key players and substitute players are distinguishably grouped and thereby displayed on the user interface 800. As shown in a dotted-line box 810, the user interface 800 may include functions for a player substitution, a strategy instruction, and a formation change. For example, a player, a strategy, and/or a formation changed by the user may be applied to a simulation from a subsequent shift point in time between attack and defense, for example, from a subsequent scene, which may affect a result of a game, for example, a simulation result.

Figure 9:
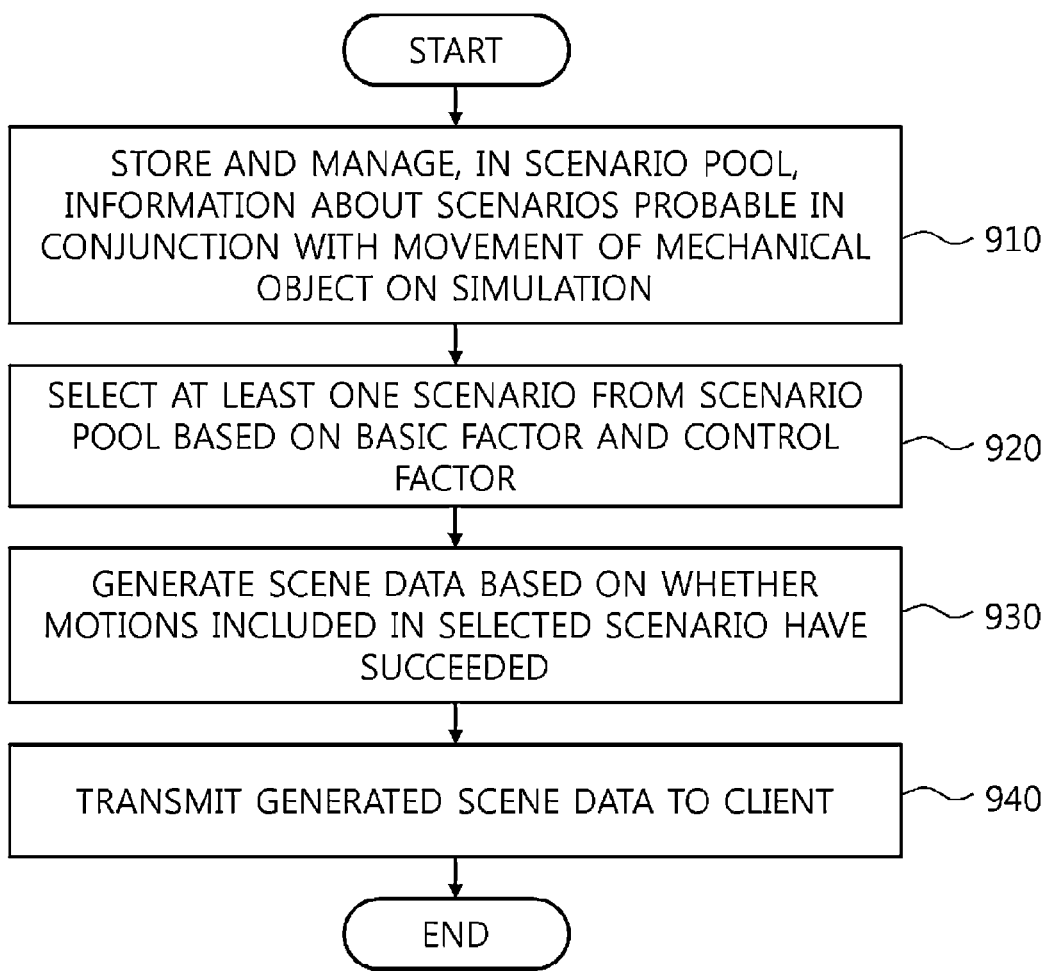
FIG. 9 illustrates a simulation method performed by a game system, according to exemplary embodiments of the present invention.

FIG. 9 illustrates a simulation method performed by a game system according to exemplary embodiments of the present invention. The simulation method according to the present exemplary embodiments may be performed by the game system 100 or a processor unit included in the game system 100. The game system 100 may include at least one processor unit and at least one communication unit.

In operation 910, the game system 100 or the processor unit may store and manage, in a scenario pool, information about probable scenarios in conjunction with a movement of a mechanical object on a simulation. For example, in a soccer game simulation, scenarios of motions probable during a soccer game may be generated, stored, and managed in the scenario pool.

In operation 920, the game system 100 or the processor unit may select at least one scenario from the scenario pool. For example, in operation 920, the game system 100 may select at least one scenario based on a basic factor including information about a scenario start location for connection between the scenarios and a control factor including a factor setting a strategy of a user.

For example, in the case of simulating a soccer game, a location of a soccer ball at a point in time when one scenario ends may be compared to a start location of a subsequent scenario using the basic factor. Also, in the above example of simulating the soccer game, the control factor may include at least one of setting values as follows:

Presence of flank or center attack

Frequency of mid-range shooting

Level of balance between attack and defense

Type of pass (short or long)

Frequency of pass or dribble

Weight for each formation

Each scenario may include path information regarding a movement of a mechanical object. A role of a character corresponding to a main entity and a type of a movement may be defined in each item of movement information. The type of the movement may include a motion of a character. In the example of simulating the soccer game, the mechanical object may include a ball object and the motion may include at least one of pass, dribble, intercept, and shooting that may be triggered using the ball object. As described above, an action, such as "success in pass", and "intercepted" may occur in response to a success or failure in a corresponding motion. The role of the character may be defined as a role on a formation, such as a striker (ST), a center mid-fielder (CM), a center back (CB), and a right wing (RW).

In operation 930, the game system 100 or the processor unit may generate scene data based on whether motions included in the selected scenario have succeeded or failed. Here, the scene data may include unit data about an action corresponding to a continuously successful motion among the motions included in the selected scenario.

For example, in the soccer game simulation, in an example in which a ball is intercepted in a left-mid-fielder area and settings are made such as an operation strategy as a 4-4-2 formation, preference of a flank attack, an attack-oriented balance, a pass preference, a high pass frequency, and a low mid-range shooting frequency, one scenario may be selected from among scenarios starting in a middle guard area. For example, the game system 100 or the processor unit may assign a probability weigh to each scenario selected based on operation strategy settings of the user and then randomly select a scenario.

The following scenario may be assumed to have been selected.

A player having a position RM-breaking through a right wing with dribble➔ RM-centering➔ a player having the position ST-heading shoot➔ END The game system 100 or the processor unit may match a player defined per unit motion in the selected scenario with player information of an actual team as follows:

CB(AAA), CM(BBB), ST(CCC), RM(DDD), where CB, CM, ST, and RM are player positions, and AAA, BBB, CCC, and DDD are player names.

A success probability of a motion may be calculated for each motion.

A first motion refers to breaking through a right wing with dribble, and a success of the first motion may be probabilistically determined by comparing abilities of a player DDD to abilities of a defending player of an opponent team. For example, abilities to be compared may be main strength, acceleration, quickness, and dribble speed.

In this example, when the motion is determined to have succeeded, the motion moves to a subsequent motion. Conversely, when the motion is determined to have failed, scene data including unit data of an action such as "blocking a dribble" may be generated and a subsequent scenario, for example, a scenario of an opponent team may be performed.

If the first motion succeeds, a success probability of a second motion of the selected scenario may be calculated. The second motion refers to centering to ST (CCC), and a success of the second motion may be probabilistically determined by comparing abilities of the player DDD, abilities of a player CCC, and abilities of a defender of an opponent team. For example, abilities of the player DDD for cross, visual field, and presence of mind, abilities of the player CCC for positioning, ball control, and body balance, and a defending capability of the defender of the opponent team may be used for comparison.

If the second motion fails, scene data including unit data about a "success in dribble" and an "intercepted" action may be generated and a subsequent scenario, for example, a scenario of the opponent team may proceed.

Conversely, if the second motion succeeds, a success probability of a third motion of the selected scenario may be calculated. The third motion refers to a heading shoot of ST (CCC) and the success of the third motion may be probabilistically determined by comparing abilities of the player CCC, abilities of the defender of the opponent team, and abilities of a goal keeper of the opponent team. For example, abilities of the player CCC for shooting, goal decisiveness, heading, and presence of mind, a defending capability of the defender of the opponent team, and abilities of the goalkeeper of the opponent for reflexes and ball handling may be used for comparison.

If the shooting motion succeeds, the score is adjusted accordingly and a kickoff scenario of the opponent team may be selected and proceed. Conversely, if the third motion fails, scene data including unit data about a "success in dribble" action, a "success in pass" action, and a "goalkeeper punching" action may be generated and a subsequent scenario, for example, a scenario of the opponent team may proceed.

If a motion fails, a variety of actions such as a "line-out" action, a "side-out" action, a "defense foul" action, an "offense foul" action, and a "goalkeeper's nice blocking" may each occur additionally or alternatively to the "intercepted" action and the "goalkeeper punching" action.

A predetermined amount of physical time, for example, ten seconds may be allocated to each unit motion. A result of repeatedly configuring such a scenario until a game is over may be configured as a single soccer game simulation result.

As described above, scene data for the entire simulation may be generated prior to providing a simulation result. Based on at least one of a formation, a strategy, and a character changed through a user interface for changing at least one of the formation, the strategy, and the character, a client may regenerate scene data after a point in time when the change is made. Accordingly, a user may intervene in the simulation result.

In operation 940, the game system 100 or the processor unit may transmit the generated scene data to the client. Here, the client, for example, the terminal 110 may verify an action based on the scene data, and may display a movement of the mechanical object made in response to the verified action using a line that connects a start location of the movement and an end location of the movement.

According to exemplary embodiments, although not illustrated, the simulation method of FIG. 9 may further include determining an occurrence of a highlight scene based on a probability that is preset based on a type of scene data, selecting scene data corresponding to the highlight scene from a highlight pool, and transmitting the selected scene data to the client in response to the occurrence of the highlight scene. For example, the highlight pool may directly include a variety of scene data, which differs from the scenario pool.

According to exemplary embodiments, the game system 100 may further include a storage unit configured to store information about at least one of a location and abilities of each of the plurality of characters, a formation, abilities of each of camps into which the plurality of characters is grouped, a characteristic for each motion, and a strategy determined by a user. In this example, the processor unit may determine whether the motion has succeeded based on at least one item of the information.

According to exemplary embodiments, the processor unit for the entire simulation may be generated prior to providing a simulation result. When at least one of a formation, a strategy, and a character is changed through a user interface for changing at least one of the formation, the strategy, and the character, a client may regenerate scene data after a point in time when the change is made.

A method of displaying a simulation result at a client and/or a highlight scene are described above with reference to FIGS. 1 through 8 and thus, a further description related thereto is omitted here.

Figure 10:
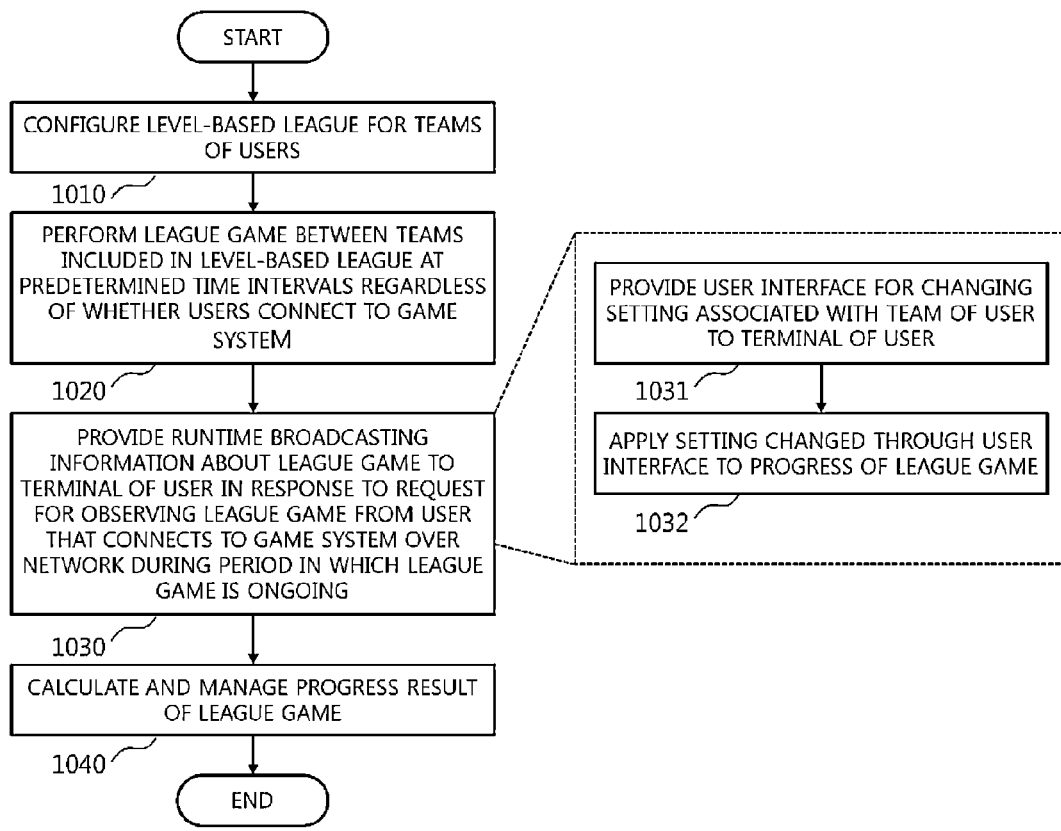
FIG. 10 is a flowchart illustrating a game method according to exemplary embodiments of the present invention.
Figure 11:
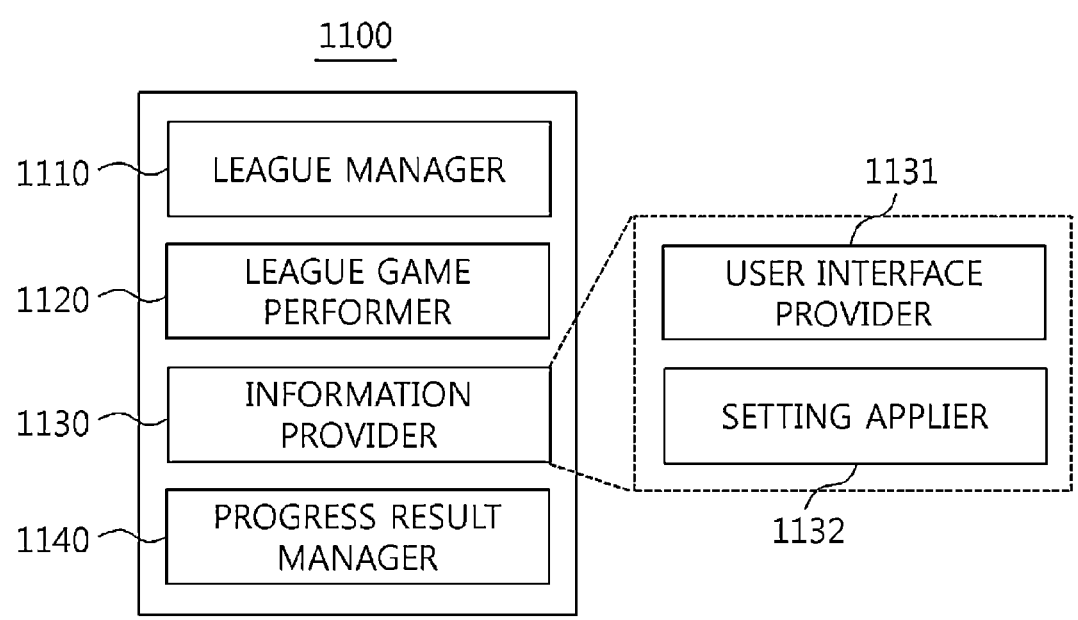
FIG. 11 illustrates a configuration of a game system, according to exemplary embodiments of the present invention.

FIG. 10 is a flowchart illustrating a game method, according to exemplary embodiments of the present invention, and FIG. 11 illustrates a configuration of a game system 1000, according to exemplary embodiments of the present invention. The game method of FIG. 10 may be performed by the game system 1000 of FIG. 11. Referring to FIG. 11, the game system 1000 may include a league manager 1110, a league game performer 1120, an information provider 1130, and a progress result manager 1140.

In operation 1010, the game system 1000 or the league manager 1110 may configure a level-based league for teams of users. As described above, a variety of level-based leagues, such as a rookie league, an amateur league, a Pro League, and a Championship League, may be present. Each level-based league may include a plurality of leagues based on the number of users belonging to a corresponding level, as described above. The game system 1000 may configure and manage a plurality of leagues by grouping teams of users into a corresponding level league.

In operation 1020, the game system 1000 or the league game performer 1120 may perform a league game between teams included in the level-based league at predetermined time intervals, regardless of whether the users connect to the game system 1000. For example, the game system 1000 may perform a game so that 12 teams belonging to a predetermined Pro League may play a league game every one hour. In this example, although users of each team do not connect to the game system 1000, the league game may be automatically performed.

In operation 1030, the game system 1000 or the information provider 1130 may provide runtime broadcasting information about the league game to a terminal of a user, in response to a request for observing the league game from the user that connects to the game system 1000 over a network, during a period in which the league game is ongoing. Here, the runtime broadcasting information may include information used to display a movement of a mechanical object made in response to an action set for the mechanical object, using a line that connects a start location of the movement and an end location of the movement, and may be provided to the user based on the aforementioned simulation method.

As described above, the league game may be performed regardless of whether a user connects to the game system 1000. The users may connect to the game system 1000 at their selections and may observe the league game. The users observing the league game may perform a manipulation, for example, a strategy instruction and/or a player substitution, which may affect a result of a game. For example, operation 1030 may include operation 1031 of providing a user interface for changing a setting associated with a team of the user to the terminal of the user, and operation 1032 of applying the setting changed through the user interface to a progress of the league game. Operation 1031 may be performed by the game system 1000, the information provider 1130, or a user interface provider 1131 included in the information provider 1130. Operation 1032 may be performed by the game system 1000, the information provider 1130, or a setting applier 1132 included in the information provider 1130.

In operation 1040, the game system 1000 or a progress result manager 1140 may calculate and manage a progress result of the league game. Here, at least one of the runtime broadcasting information and the progress result of the league game may be provided to the user through a webpage provided from the game system 1000 to the terminal of the user.

FIG. 12 illustrates a portion of a screen 1200 on which information about a configured league is displayed according to exemplary embodiments of the present invention. For example, information about a "Pro League 1" including 12 teams, a ranking of each team, a club name thereof (team name) that may include information about the user, the number of games played, the number of games recorded as a win, the number of games recorded as a tie, and the number of games recorded as a loss, are displayed on the screen 1200. Also, on the screen 1200, an "elevation rank" may refer to a ranking at which a team capable of advancing to an upper level league, for example, a Championship League is determined, a "advancement rank to an elevation play off (PO)" may refer to a ranking at which a team for advancing to an upper level league through an elevation PO is determined, a "remaining rank" may refer to a ranking at which a team remaining at a current level league is determined, and a "degradation rank" may refer to a ranking at which a team to be degraded to a lower level league, for example, a Pro League 2 is determined. For example, when the "Pro League 1" is terminated, a first ranking team and a second ranking team may advance to an upper level league. Also, two teams to advance to the upper level league may be determined through an elevation PO from among a third ranking team, a fourth ranking team, a fifth ranking team, and a sixth ranking team. Also, a ninth ranking team, a tenth ranking team, an eleventh ranking team, and a twelfth ranking team may be degraded to a lower level league.

FIGS. 13 and 14 illustrate a portion of a screen on which information about the progress of a game is displayed according to exemplary embodiments of the present invention. A game schedule of a game to be performed per hour is displayed on a first screen 1300. Referring to FIG. 13, a 10:00 game, an 11:00 game, and a 12:00 game are already over and the game results have been determined and displayed. The remaining games are to be performed. As described above, according to exemplary embodiments of the present invention, a league game between teams may be performed at predetermined time intervals regardless of whether users connect to a game system. In this example, if a 13:00 game is performed after a predetermined period of time is elapsed, information 1410 indicating that a current game is ongoing may be displayed on a second screen 1400. A user may click on a link included in the information 1410 and may be provided with runtime broadcasting information. For example, once the user clicks on a corresponding link, a webpage through which the corresponding game is broadcasted in runtime may be provided to a terminal of the user. Screens for broadcasting the game may be displayed on the terminal of the user through the provided webpage using the aforementioned simulation method. The user may observe the game or intervene in the game through user interfaces provided through the corresponding webpage.

Hereinafter, a team feature will be further described.

FIG. 15 illustrates an example of a screen 1500 on which a team feature is displayed according to exemplary embodiments of the present invention. Referring to the screen 1500, a team feature refers to a team advantage that is selectable based on a chemistry between players, and may be triggered during a game based on a predetermined condition. In this case, additional abilities, that is, ability values may be assigned to characters that trigger the corresponding team feature. For example, in FIG. 15, in a case in which at least a predetermined number of players from a predetermined league or a predetermined country gather or at least a predetermined number of players corresponding to a predetermined level or more gather, abilities of the corresponding players may increase. That is, based on types of players, for example, characters collected by the user, a variety of team features may be applied. The user may play a game by applying a predetermined number of team features among applicable team features.

Figure 16:
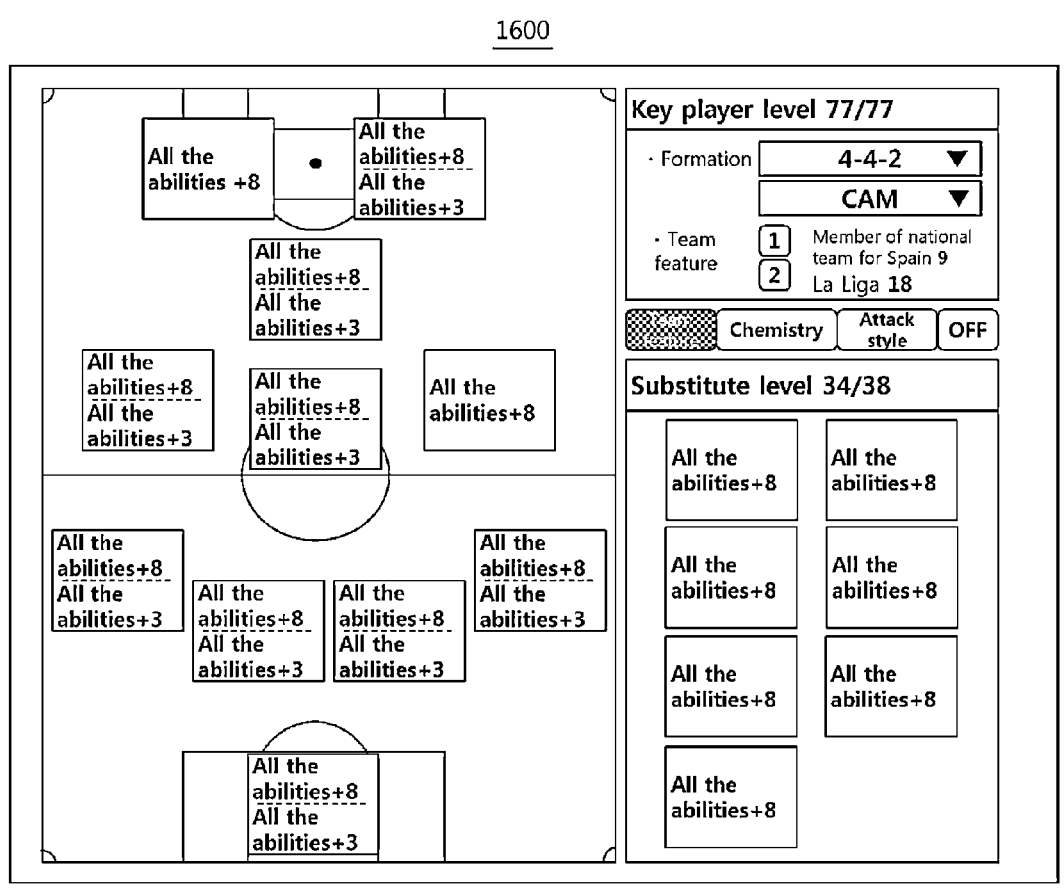
FIG. 16 illustrates an example of a screen on which a team feature is applied, according to exemplary embodiments of the present invention.

FIG. 16 illustrates an example of a screen 1600 on which a team feature is applied according to exemplary embodiments of the present invention. Referring to the screen 1600, team feature "9 members of national team for Spain" and team feature "La Liga 18" of FIG. 15 are applied and accordingly, abilities of key players and substitute players are increased. For example, the team feature "La Liga 18" is applied on the screen 1600 and thus, "all the abilities+8" is applied to a total of 18 players including key players and substitute players of FIG. 15. The team feature "9 members of national team for Spain" is applied on the screen 1600 and thus, "all the abilities +3" is applied only to nine key players (those who cause the team feature) as described in FIG. 15.

Figure 17:
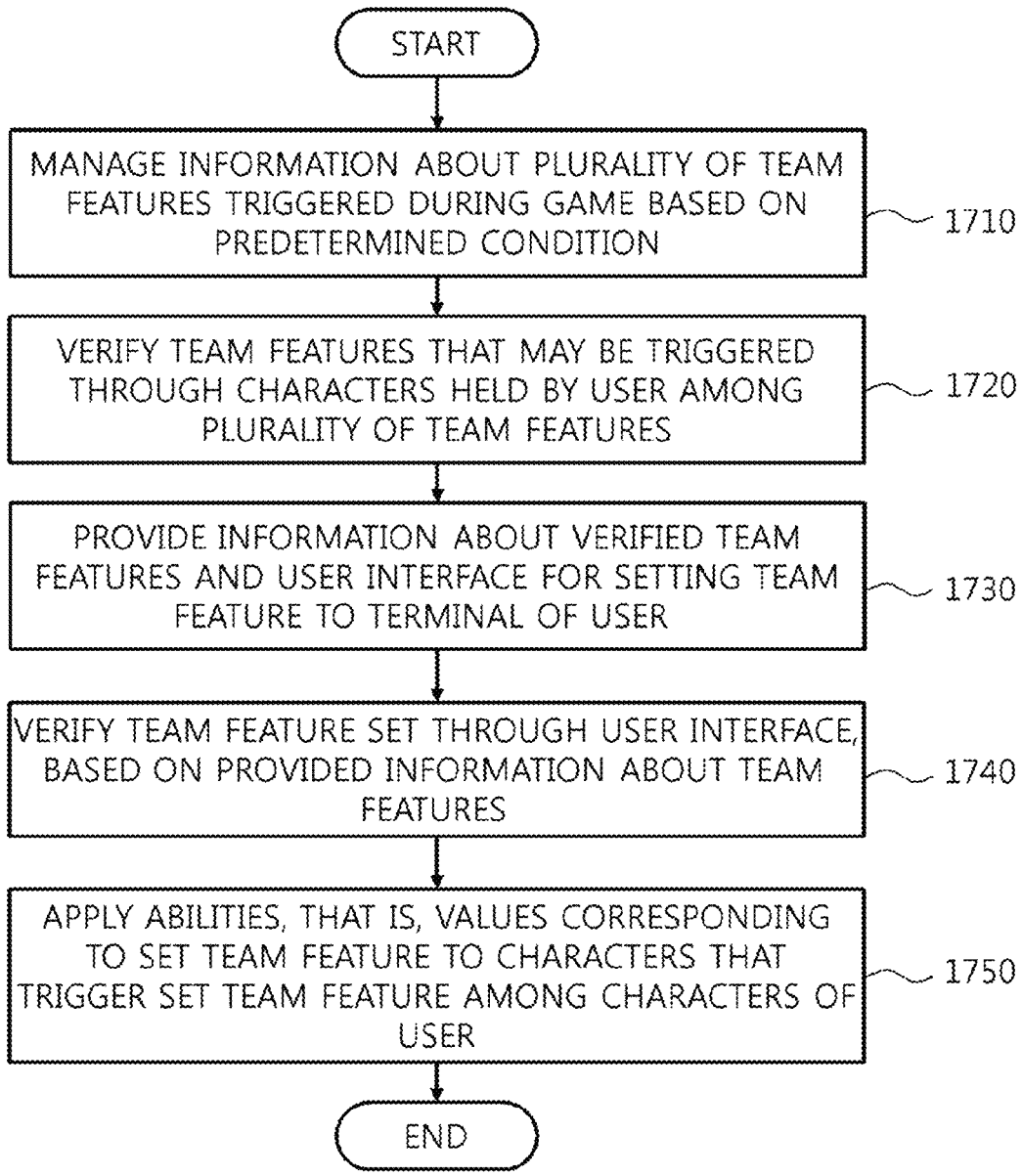
FIG. 17 is a flowchart illustrating a game method according to exemplary embodiments of the present invention.
Figure 18:
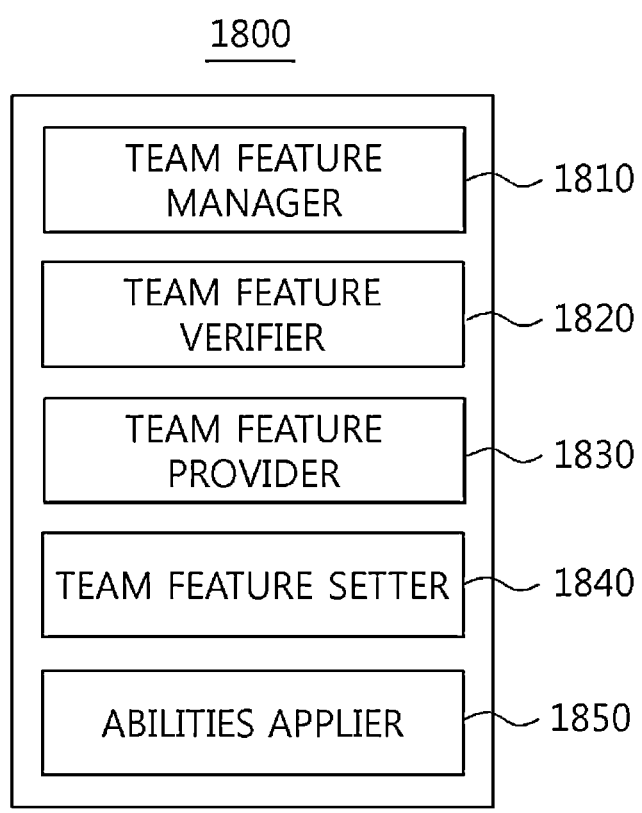
FIG. 18 illustrates a configuration of a game system according to exemplary embodiments of the present invention.

FIG. 17 is a flowchart illustrating a game method according to exemplary embodiments of the present invention, and FIG. 18 illustrates a configuration of a game system 1800 according to exemplary embodiments of the present invention. The game method of FIG. 17 may be performed by the game system 1800 of FIG. 18. Referring to FIG. 18, the game system 1800 may include a team feature manager 1810, a team feature verifier 1820, a team feature provider 1830, a team feature setter 1840, and an abilities applier 1850.

In operation 1710, the game system 1800 or the team feature manager 1810 may manage information about a plurality of team features triggered during a game based on a predetermined condition. For example, characters of the game may include characters having characteristics of players of a soccer game. In this example, the predetermined condition may include at least one of: (1) a condition about the number of players having at least one of a level, abilities, a birth year, a height, and a weight within a predetermined range, (2) a condition about the number of players having at least one of a nationality, an origin of league, and an origin of club, (3) a condition about whether players are key players, and (4) a condition about whether a predetermined player is included.

In this example, according to an increase in the number of players set in a predetermined condition, abilities set for a team feature corresponding to the predetermined condition may increase. For example, the team feature "La Liga 18", described above with reference to FIG. 16, refers to a team characteristic triggered when 18 players that originate from the Spanish league gather and thus, "all the abilities+8" is provided. Here, abilities to be provided based on the number of players set in the predetermined condition may vary, such as providing "all the abilities+6" in the case of team feature "La Liga 17" (triggered when 17 players that originate from the Spanish league gather) and providing "all the abilities+ 5" in the case of team feature "La Liga 16" (triggered when 16 players that originate from the Spanish league gather).

In operation 1720, the game system 1800 or the team feature verifier 1820 may verify team features that may be triggered through characters held by the user among the plurality of team features. Here, information about the verified team features may include at least one of information about a team feature applied to characters of the user, information about a team feature applicable to the characters of the user, information about a team feature applicable in the case of substituting a character that constitutes a team among the characters of the user, and information about a team feature applicable by obtaining a new character.

In operation 1730, the game system 1800 or the team feature provider 1830 may provide information about the verified team features and a user interface for setting a team feature to the terminal of the user. For example, the game system 1800 or the team feature provider 1830 may provide information about the verified team features and the user interface for setting a team feature through a webpage. An example in which a game service may be provided to the terminal of the user through the webpage is described above.

In operation 1740, the game system 1800 or the team feature setter 1840 may verify the team feature set through the user interface, based on the provided information about the team features. Referring to FIG. 16, a team feature selected by the user from among the team features may be verified.

In operation 1750, the game system 1800 or the abilities applier 1850 may apply abilities, that is, values corresponding to the set team feature to characters that trigger the set team feature among characters of the user. An example in which abilities corresponding to a team feature are applied to characters triggering the team feature is described above with reference to FIG. 16.

According to the above, a game according to the present exemplary embodiments may include a game in which a level-based league is configured for teams of users and a league game between teams belonging to the level-based league is performed at predetermined time intervals regardless of whether the users connect to a game system.

Figure 19:
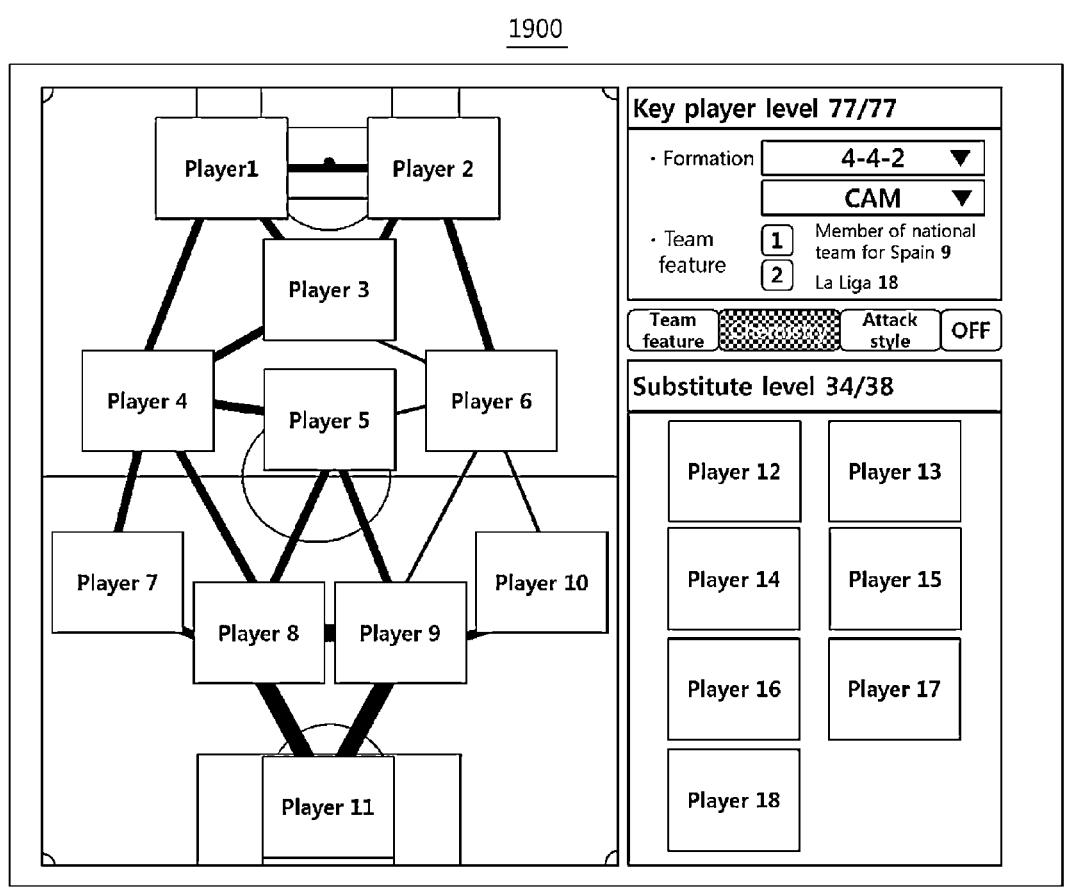
FIG. 19 illustrates an example of a screen on which a chemistry is applied, according to exemplary embodiments of the present invention.

FIG. 19 illustrates an example of a screen 1900 on which a chemistry is applied according to exemplary embodiments of the present invention. Referring to the screen 1900, adjacent players are connected to each other using a line with respect to 11 players. Here, 11 players are players 1 through 11 that represent selected players. The line may indicate the chemistry representing a relationship between two players. A thickness of the line may indicate a level of chemistry. The thicker the line is, the higher the chemistry level. A higher chemistry level results from strengths of different types of relationships between two players. For example, such a chemistry level may be affected by whether two players have the same nationality, whether two players originate from the same league, or whether two players originate from the same club. A total of three levels of lines are displayed on the screen 1900. It is noted that the number of chemistry relationships shown in FIG. 19 are limited for the purpose of illustration, each player will have a chemistry determination with each other player on the same team.

Here, a level may be expressed using a thickness of a line. For example, player 6 and player 9 are connected using a thinnest line representing a level 1 chemistry, which is a lowest chemistry level. Player 8 and player 11 are connected using a thickest line representing level 3 chemistry, which is a highest chemistry level. Level 3 chemistry may indicate a case in which all of a nationality, an origin of league, and an origin of club are identical between two players. Level 1 may indicate a case in which only one of the nationality, the origin of league, and the origin of club is identical between two players.

That is, if two players originate from the same country, from the same league, or from the same club, the two players may be determined to have a relatively close relationship, and a high chemistry level may be set between the two players.

The chemistry level may be applied to the progress of the game. For example, in the case of selecting a scenario, a scenario of passing a ball to a player having a relatively high chemistry level between two players at front may be preferentially selected.

Figure 20:
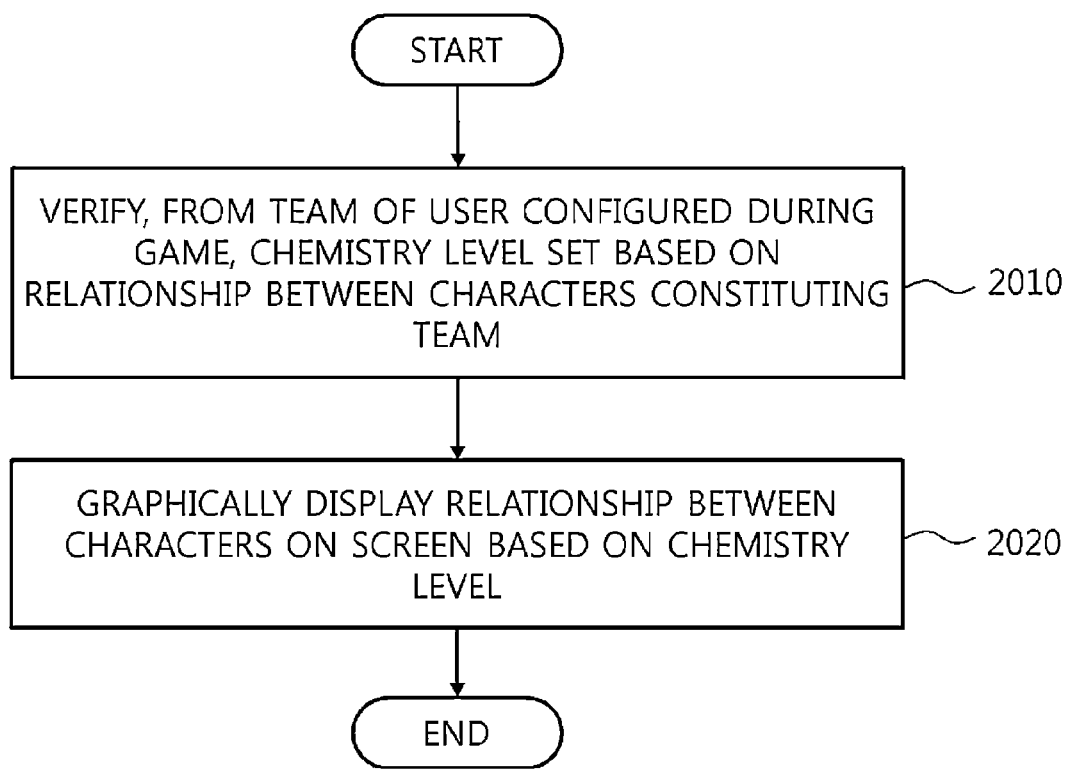
FIG. 20 is a flowchart illustrating a game method performed by a terminal, according to exemplary embodiments of the present invention.

FIG. 20 is a flowchart illustrating a game method performed by a terminal according to exemplary embodiments of the present invention. In operation 2010, the terminal may verify, from a team of a user configured during a game, a chemistry level set based on a relationship between characters constituting the team. For example, a game system may provide a webpage for a game service to the terminal and the terminal may verify a chemistry level set based on the relationship between characters included in the webpage. Here, information about at least one of a nationality, an origin of league, and an origin of club may be set for each of the characters. In this example, the chemistry level may be set based on whether information about at least one of the nationality, the origin of league, and the origin of club is identical between two characters adjacent based on a formation of the team. As described above, according to an increase in the number of identical items among the nationality, the origin of league, and the origin of club, the chemistry level may also increase.

In operation 2020, the terminal may graphically display the relationship between characters on the screen based on the chemistry level. For example, the terminal may connect and thereby display, on the screen, the relationship between characters using a line having a different thickness or a different color based on a chemistry level between the characters. Although an example in which the relationship between characters is indicated using a line having a different thickness is described with reference to FIG. 19, the relationship between characters may be expressed using a variety of methods such as, for example, a method of applying a numerical level value to a different color or line.

The game according to the exemplary embodiments of FIG. 20 may also include a game in which a level-based league is configured for teams of users and a league game between teams belonging to the level-based league is performed at time intervals predetermined at a server regardless of whether the users connect to a game system.

Also, at least one of a relationship between characters, a process about the progress of a game, and a result of the progress of the game may be displayed on a screen of a terminal through a webpage received from the server.

Figure 21:
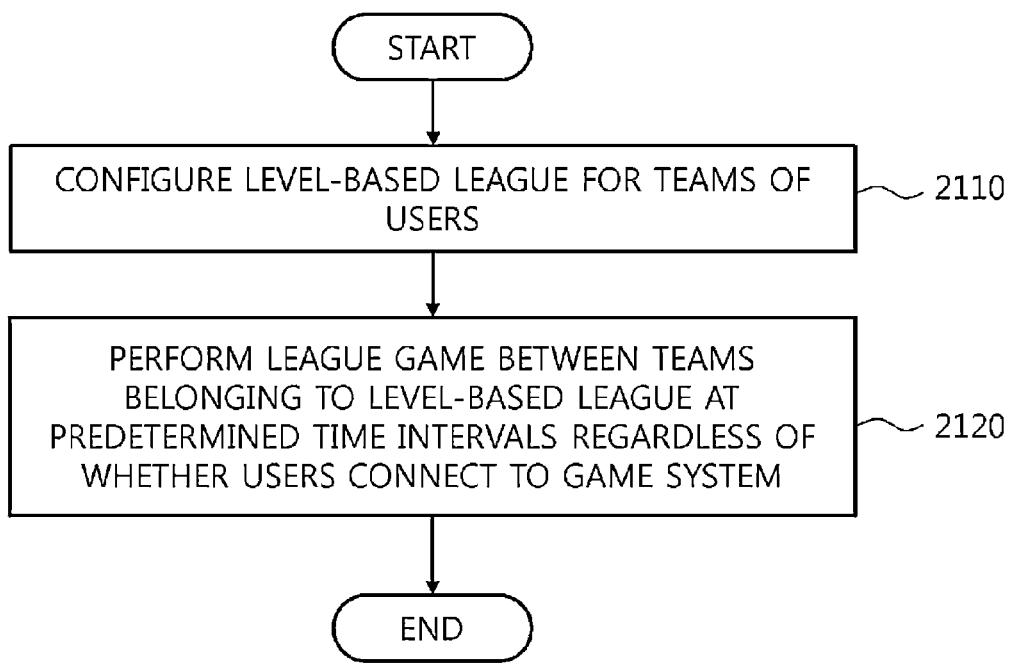
FIG. 21 is a flowchart illustrating a game method performed by a game system, according to exemplary embodiments of the present invention.
Figure 22:
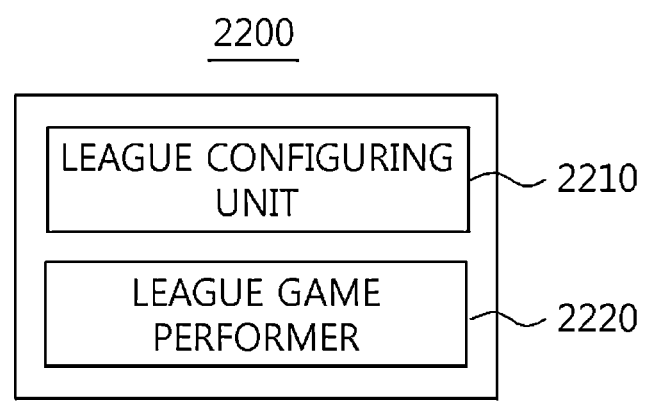
FIG. 22 illustrates a configuration of a game system according to exemplary embodiments of the present invention.

FIG. 21 is a flowchart illustrating a game method performed by a game system according to exemplary embodiments of the present invention, and FIG. 22 illustrates a configuration of a game system 2200 according to exemplary embodiments of the present invention. The game method of FIG. 21 may be performed by the game system 2200 of FIG. 22. Referring to FIG. 22, the game system 2200 may include a league configuring unit 2210 and a league game performer 2220.

In operation 2110, the game system 2200 or the league configuring unit 2210 may configure a level-based league for teams of users.

In operation 2120, the game system 2200 or the league game performer 2220 may perform a league game between teams belonging to the level-based league at predetermined time intervals regardless of whether the users connect to the game system 2200. In this example, the game system 2200 or the league game performer 2220 may perform the league game by applying a chemistry level set based on a relationship between characters adjacent based on a formation of a team.

Depending on a necessity, although not illustrated, the game method according to the present exemplary embodiments may further include providing, to a terminal of a user through a webpage, at least one of a progress process of the league game, a progress result of the league game, and information used to graphically represent a chemistry level. This operation may be performed by the game system 2200 or an information provider (not shown) that may be further included in the game system 2200.

According to exemplary embodiments of the present invention, it is possible to perform a league game by grouping teams of users configured on a game based on a level-based league or grouping a team including at least one bot with the teams of the users based on a level-based league, and by processing a game to be automatically performed between teams of users included in the same league at predetermined time intervals, for example, every one hour.

It is possible to minimize temporal constraints and spatial constraints by providing a web-based simulation for a league game, and to further effectively provide a simulation of a sports game by simplifying a simulation representation.

It is possible to perform a game by offering a user with team features having a variety of abilities based on conditions of characters included in a single team and by applying, to at least one character, abilities corresponding to a predetermined number of team features selected by the user from among the offered team features.

It is possible to perform a game by determining a chemistry value indicating a relationship between characters, based on a relationship between characters included in a single team, by graphically displaying the determined chemistry value on a screen, and by applying the chemistry value between characters.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
generating, via at least one processor of a game system, a user interface to enable user selection of a team feature among team features capable of being applied during a game based on satisfaction of a predetermined condition by first characters of a team of the game, the team feature affecting abilities of the first characters;
detecting, via the at least one processor, a level of satisfaction of the predetermined condition by the first characters, the level of satisfaction of the predetermined condition being proportional to a number of the first characters satisfying the predetermined condition;
adjusting, via the at least one processor, the abilities of the first characters according to the selected team feature and the level of satisfaction of the predetermined condition by the first characters; and
performing, via the at least one processor, gameplay of the game, the gameplay simulating physical manipulation of at least one object by at least one of the first characters according to the adjusted abilities.

2. The method of claim 1, further comprising:
generating, via the at least one processor, display information comprising at least one of:
information about a team feature applied to the first characters;
information about a team feature applicable to the first characters;
information about a team feature applicable in accordance with a substitution of at least one of the first characters with at least one other character of the team; and
information about a team feature applicable in accordance with obtaining a new character as part of the team,
wherein the user interface is configured to present the display information to the user.

3. The method of claim 1, wherein the predetermined condition comprises at least one of:
a condition about a number of first characters exhibiting at least one of a level in a predetermined range, an ability in a predetermined range, a birth year in a predetermined range, a height in a predetermined range, and a weight in a predetermined range;
a condition about a number of the first characters exhibiting at least one of a predetermined nationality, a predetermined origin of league, and a predetermined origin of club;
a condition about whether at least one of the first characters is a key character; and
a condition about whether the team comprises a predetermined character.

4. The method of claim 1, wherein:
performing the gameplay of the game comprises performing a league game between teams corresponding to owners of the teams;
the teams comprise the team, the teams belonging to a level-based league; and
the league game is performed regardless of whether the owners of the teams are connected to the game system.

5. The method of claim 1, wherein the user interface is provided through a webpage.

6. The game system of claim 1, wherein the level of satisfaction of the predetermined condition by the first characters is detected during the gameplay.

7. The game system of claim 6, wherein the abilities of the first characters are dynamically adjusted during the gameplay in response to the dynamic detection of the level of satisfaction of the predetermined condition by the first characters.

8. The game system of claim 1, wherein the first characters and second characters define the team.

9. The game system of claim 8, further comprising:
adjusting, via the at least one processor, abilities of the second characters according to the selected team feature and the level of satisfaction of the predetermined condition by the first characters.

10. The game system of claim 8, further comprising:
detecting, via the at least one processor, a level of satisfaction of the predetermined condition by the second characters,
wherein the abilities of the first characters are further adjusted according to the level of satisfaction of the predetermined condition by the second characters.

11. The game system of claim 8, wherein:
the first characters correspond to active participants in the gameplay; and
the second characters correspond to inactive participants in the gameplay.

12. The game system of claim 1, wherein adjusting the abilities of the first characters comprises:
adding, via the at least one processor, a new ability to at least one of the first characters.

13. The game system of claim 1, wherein:
the selected team feature comprises a plurality of adjustments capable of being applied during the game; and
each of the plurality of adjustments corresponds to a different level of satisfaction of the predetermined condition by the first characters.

14. A non-transitory computer-readable storage medium comprising one or more sequences of one or more instructions that, when executed by at least one processor, cause an apparatus to perform at least the following:
generating a user interface to enable user selection of a team feature among team features capable of being applied during a game based on satisfaction of a predetermined condition by first characters of a team of the game, the team feature affecting abilities of the first characters;
detecting a level of satisfaction of the predetermined condition by the first characters, the level of satisfaction of the predetermined condition being proportional to a number of the first characters satisfying the predetermined condition;
adjusting the abilities of the first characters according to the selected team feature and the level of satisfaction of the predetermined condition by the first characters; and
performing gameplay of the game, the gameplay simulating physical manipulation of at least one object by at least one of the first characters according to the adjusted abilities.

15. A game system comprising:
at least one processor; and
at least one memory comprising one or more sequences of one or more instructions that, when executed by the at least one processor, cause the game system at least to:
generate a user interface to enable user selection of a team feature among team features capable of being applied during a game based on satisfaction of a predetermined condition by first characters of a team of the game, the team feature affecting abilities of the first characters;
detect a level of satisfaction of the predetermined condition by the first characters, the level of satisfaction of the predetermined condition being proportional to satisfaction of the predetermined condition by a number of the first characters;
adjust the abilities of the first characters according to the selected team feature and the level of satisfaction of the predetermined condition by the first characters; and
perform gameplay of the game, the gameplay simulating physical manipulation of at least one object by at least one of the first characters according to the adjusted abilities.

16. The game system of claim 15, wherein the game system is further caused at least to:
generate display information comprising at least one of:
information about a team feature applied to the first characters;
information about a team feature applicable to the first characters;
information about a team feature applicable in accordance with a substitution of at least one of the first characters with at least one other character of the team; and
information about a team feature applicable in accordance with obtaining a new character as part of the team; and
present the display information via the user interface.

17. The game system of claim 15, wherein the predetermined condition comprises at least one of:
a condition about a number of first characters exhibiting at least one of a level in a predetermined range, an ability in a predetermined range, a birth year in a predetermined range, a height in a predetermined range, and a weight in a predetermined range;
a condition about a number of the first characters exhibiting at least one of a predetermined nationality, a predetermined origin of league, and a predetermined origin of club;
a condition about whether at least one of the first characters is a key character; and
a condition about whether the team comprises a predetermined character.

18. The game system of claim 15, wherein the game system is further caused at least to:
configure a level-based league comprising teams corresponding to team owners; and
perform gameplay of a league game between at least two of the teams of the level-based league at a predetermined time interval regardless of whether the team owners of the at least two teams in the league game are connected to the game system.

19. The game system of claim 15, wherein the game system is further caused at least to:
provide the user interface through a webpage.

* * * * *